Sept. 8, 1936.  W. DE F. CROWELL  2,053,323
VENTILATING APPARATUS FOR VEHICLE BODIES
Filed May 18, 1933   5 Sheets-Sheet 1
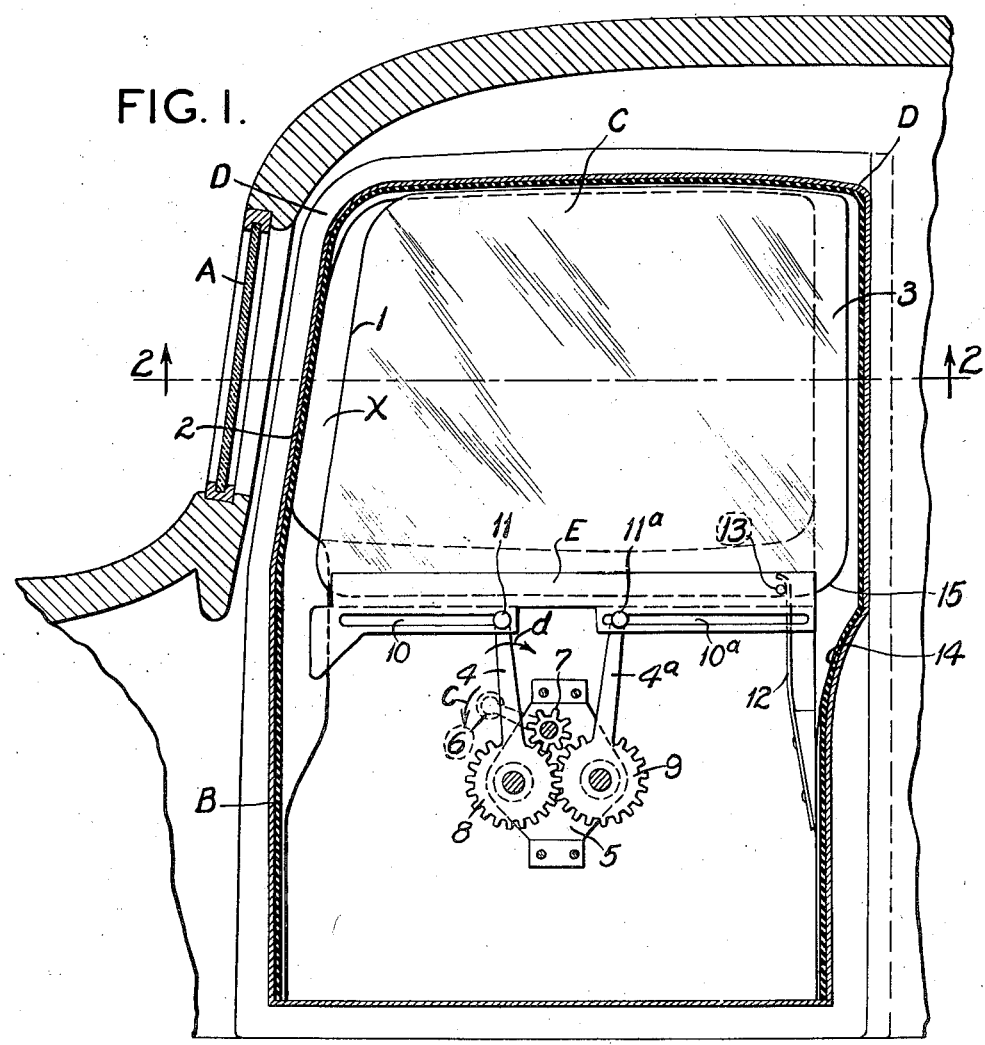
FIG. 1.
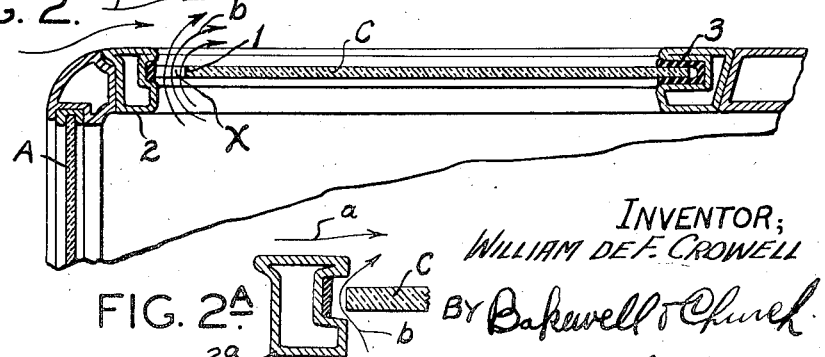
FIG. 2.
FIG. 2A.
INVENTOR;
WILLIAM DE F. CROWELL
BY Bakewell & Church
ATTORNEYS Sept. 8, 1936.   W. DE F. CROWELL   2,053,323
VENTILATING APPARATUS FOR VEHICLE BODIES
Filed May 18, 1933   5 Sheets-Sheet 2

INVENTOR;
WILLIAM DE F. CROWELL
BY Bakewell & Church
ATTORNEYS

Sept. 8, 1936.          W. DE F. CROWELL          2,053,323
VENTILATING APPARATUS FOR VEHICLE BODIES
Filed May 18, 1933          5 Sheets-Sheet 3

INVENTOR;
WILLIAM DE F. CROWELL
BY Bakewell & Church
ATTORNEYS

Sept. 8, 1936.  W. DE F. CROWELL  2,053,323
VENTILATING APPARATUS FOR VEHICLE BODIES
Filed May 18, 1933.  5 Sheets-Sheet 4
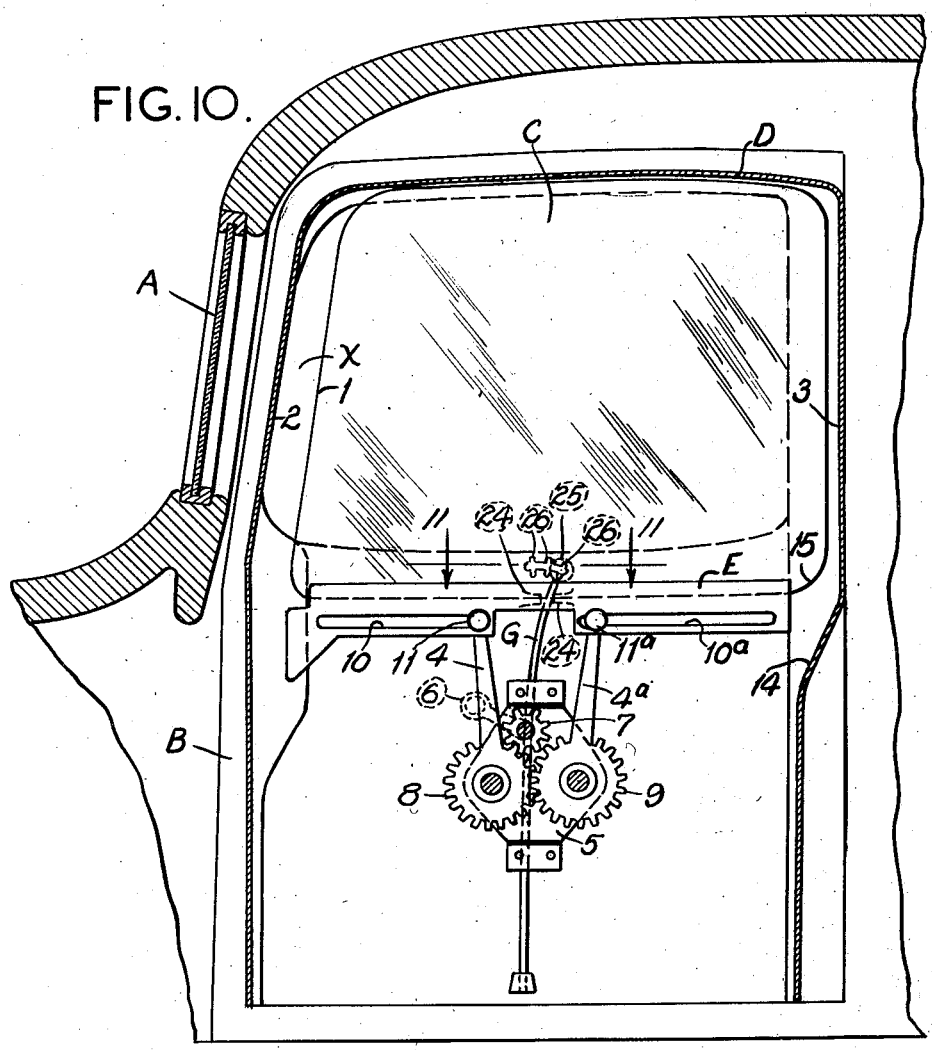
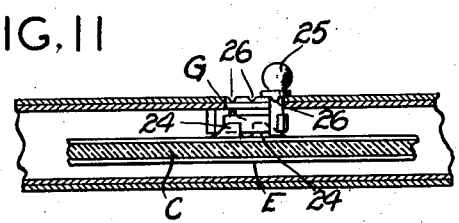
INVENTOR;
WILLIAM DE F. CROWELL
By Bakewell & Church
ATTORNEYS

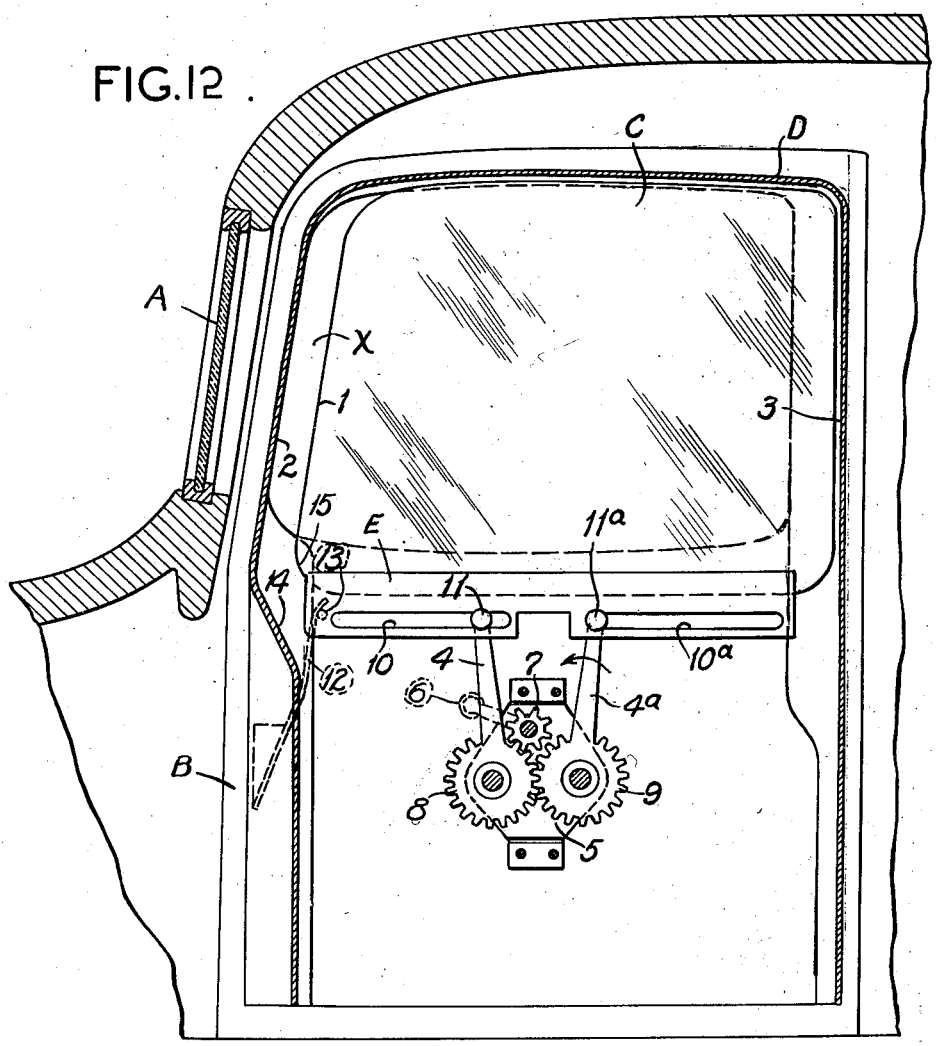

Patented Sept. 8, 1936

2,053,323

UNITED STATES PATENT OFFICE 2,053,323

VENTILATING APPARATUS FOR VEHICLE BODIES

William de F. Crowell, St. Louis, Mo., assignor to Automobile Ventilation, Inc., Detroit, Mich., a corporation of Michigan Application May 18, 1933, Serial No. 671,641

12 Claims. (Cl. 296—44)

This invention relates to ventilating apparatus for vehicle bodies of the type or kind that have provision for producing a relatively narrow, substantially upright suction opening or ventilating slot in a side wall of the body, through which foul air, gases, smoke and the like are withdrawn from the interior of the body when the vehicle is in forward motion, without liability of air blowing into the body through said slot or opening, and causing annoyance or discomfiture to the occupants of the vehicle.

The main object of my invention is to provide a novel means for efficiently ventilating an automobile body or other vehicle body without adding materially to the cost of same, and without marring or changing the appearance of the body.

Another object is to construct and arrange the conventional one-piece automobile window or door glass so that it can be adjusted vertically to serve as a complete closure for a window opening, and also adjusted horizontally when in its closed or substantially fully raised position, to produce a ventilating slot or suction opening at one of the upright edges of the window.

Another object of my invention is to provide a vehicle ventilating apparatus that is equipped with a window operating mechanism which is so constructed or designed that it is adapted to be actuated to open or close the window and also to bodily move the window horizontally into a ventilating position, wherein a ventilating slot is provided at one of the upright edges of the window, and tight or substantially tight joints are maintained at the remaining three edges of the window.

Another object is to provide a vehicle ventilating apparatus that is equipped with a window operating mechanism, which, in addition to having the desirable feature or characteristic above pointed out, also has provision for maintaining or holding the window in its ventilating position.

Another object of my invention is to provide a vehicle ventilating apparatus comprising a one-piece window mounted so as to be capable of being raised and lowered and also moved horizontally to produce or to close a ventilating slot at one upright edge of the window, and an operating mechanism for said window that can be designed or constructed to cause the window to move horizontally automatically in a direction either to produce or to close the ventilating slot when the window is being lowered, or to move horizontally automatically in a direction either to produce or to close the ventilating slot when the window is being raised.

Another object is to provide a novel form of guiding means for an adjustable automobile window or door glass. Other objects and desirable features of my invention will be hereinafter pointed out.

Figure 1 of the drawings is a fragmentary longitudinal sectional view of an automobile body, illustrating my improved ventilating apparatus applied to the left hand front door of the body, the outer panel of said door being removed and the window frame of the door being broken away so as to more clearly illustrate the construction and operation of said apparatus.

Figure 2 is a horizontal sectional view, taken on the line 2—2 of Figure 1.

Figure 2a is a sectional view, similar to Figure 2, showing a change that can be made in the cross-sectional shape of the front upright member of the window frame.

Figures 9a, 9b, 9c and 9d are sectional views taken substantially along the lines A—A, B—B, C—C and D—D, respectively, of Fig. 8.

Figure 10 is a view similar to Figure 1, illustrating a window operating mechanism equipped with a manually-shiftable guide member which the user can adjust in different positions to produce a ventilating slot of variable width that is rendered operative automatically during the operation of raising the window.

Figure 11 is a sectional view, taken on the line 11—11 of Figure 10; and

Figure 12 is a view illustrating a window operating mechanism of substantially the same construction as that shown in Figure 1, but with the parts of same reversed or disposed so that the window will automatically assume its ventilating position during the operation of raising the same.

Figure 3:
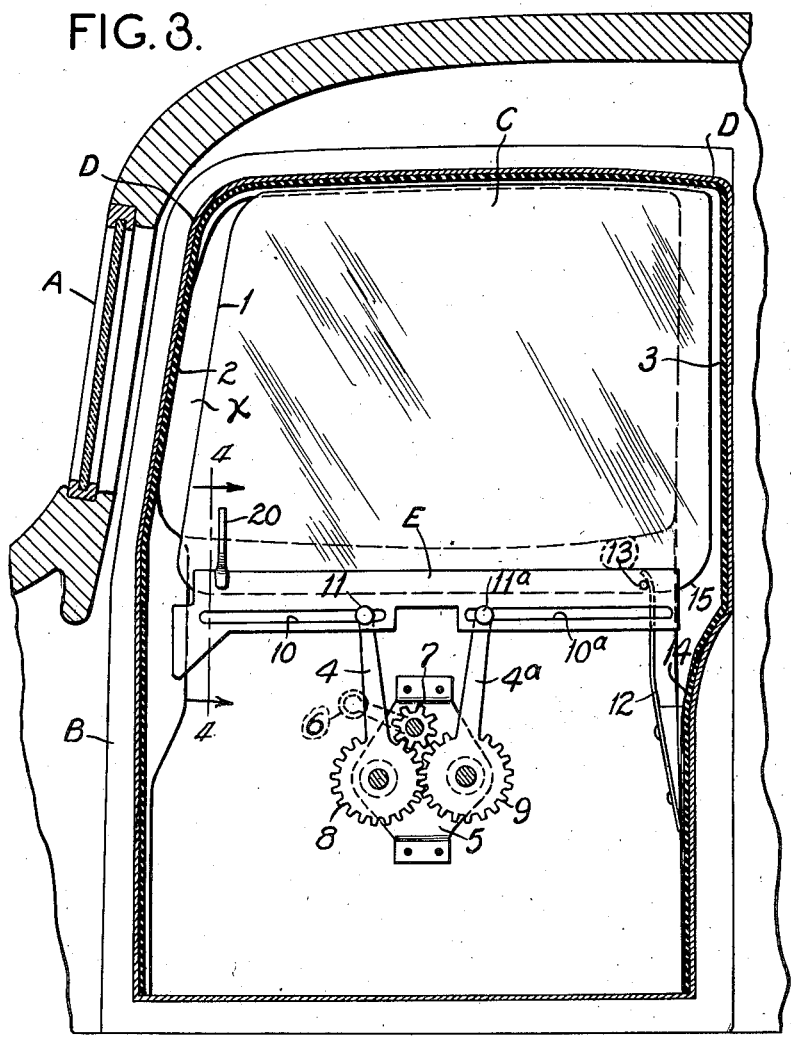
Figure 3 is a view similar to Figure 1, illustrating a window operating mechanism that comprises a manually operated means for moving the window rearwardly, so as to produce a ventilating slot at the front edge of the window.

I have herein illustrated my invention applied to or embodied in a vehicle side door window whose front upright frame member slopes rearwardly or is slightly inclined, but I wish it to be understood that it is immaterial, so far as my invention is concerned, whether said front frame member is a vertical member or is a forwardly inclined or rearwardly inclined member. The sliding window that forms one element of my improved ventilating apparatus is herein illustrated as being constructed from a single piece of heavy glass whose top, front and rear edges are not encased in or protected by a sash frame, but it will be obvious that it is immaterial whether the window is formed from a thick piece of glass having no marginal binding, or formed from a piece of glass mounted in or secured to a sash frame. The window is constructed in the form of a single unit, so that it will constitute a complete closure for the window opening with which it is combined. The window may either be mounted in a stationary portion of the side wall of the vehicle body in such a way that it can be raised, lowered and also moved horizontally forwardly and rearwardly, as hereinafter described, or it may be mounted in a movable portion of the side wall, such, for example, as in a front door or a rear door of the kind conventional automobile bodies are equipped with.

In Figure 1 of the drawings A designates a conventional transversely-disposed window shield at the front end of an automobile body, B designates the front door in the left hand side wall of said body, and C designates an adjustable window mounted in said door so as to form the upper portion of the door. The window C is preferably formed from a single piece of thick or heavy glass, and is mounted in the door B in such a way that the window can be opened by lowering it or moving it downwardly into a pocket formed in the lower half of the door. When the window C is in its closed or fully raised position, it is surrounded by a window frame D that constitutes an integral portion of the door.

The window C, above described, is mounted in a different manner from the conventional one-piece automobile window or door glass, in that in addition to being capable of being moved vertically into and out of a closed position, it is also capable of being moved horizontally into a ventilating position, wherein one of its upright edges, preferably its front edge 1, is spaced away from the front upright member 2 of the window frame D to produce a ventilating slot or suction opening $x$, as shown in Figures 1 and 2. When the vehicle is in forward motion, the air that rushes rearwardly over the side wall of the body, as indicated by the arrows $a$ in Figure 2, creates a suction or partial vacuum on the ventilating slot $x$ that causes foul air, gases, smoke and the like on the interior of the vehicle body to be effectively withdrawn from the body through said slot, as indicated by the arrows $b$ in Figure 2. Due to the fact that the ventilating slot $x$ is disposed vertically or substantially so, in close proximity to the front upright member 2 of the window frame, and is relatively narrow (usually about an inch or so in width), there is little or no tendency for rain to beat into the vehicle through said slot. When it is desired to close the ventilating slot $x$ and thus cut off the circulation of air in the body, the window C is moved forwardly so as to produce a tight joint between the front edge 1 of same and the front upright member 2 of the window frame D.

The front upright member 2 of the window frame that co-acts with the front edge portion of the window may be of various shapes in cross section. In Figure 2 said member 2 is illustrated as being provided with a relatively shallow groove that is adapted to house the extreme front edge of the window or a strip of packing material with which the front edge of the window contacts to produce a tight joint. In Figure 2a the front upright member $2^a$ of the window frame is illustrated as being provided with a relatively deep channel or groove that is adapted to receive and embrace the front edge portion of the window when it is in its extreme forward position, said channel or groove being of such depth that even though the window is adjusted rearwardly to produce a ventilating slot at the front edge of same, said front edge will not be withdrawn completely from the channel, or in other words, will not be spaced far enough away from the frame member $2^a$ to produce a ventilating slot through which rain can beat sidewise into the vehicle body.

Preferably, the front and rear upright members and the top horizontal member of the window frame D are provided with a grooved or channeled structure, shown in Figure 11, that receives the front, top and rear edges of the window when the window is in its closed or substantially fully raised position, and which serves as a guide for the window when the window is being raised and lowered. By referring to Figures 8, 9a, 9b, 9c and 9d it will be noted that the front channel which receives the front edge portion of the window is provided with a relatively wide part $2^b$ and a narrow part $2^c$, and the rear channel that receives the rear edge portion of the window is provided with a relatively wide part $3^b$ and a narrow part $3^c$, the purpose of providing the rear channel with a wide part $3^b$ being to permit the window to move rearwardly sufficiently to produce the ventilating slot $x$, and the purpose of providing the front channel with a wide part $2^b$ being to insure that the front end portion of the member E at the bottom edge of the window will remain in the front channel when the window is shifted rearwardly into its ventilating position. When the window is moved forwardly while in its substantially fully raised position, to produce a tight joint between the front edge 1 of the window and the channeled structure combined with the front upright frame member 2, the wide portion $3^b$ of the rear channel remains in engagement with the rear edge portion of the window, and thus maintains a tight joint with the same. The upper horizontally-disposed channel $3^d$ that receives the top edge portion of the window is deep enough to maintain a tight joint with this portion of the window when the window is in its extreme forward position, and also provide for a slight bodily upward movement of the window when the window is shifted rearwardly to produce the ventilating slot $x$. The channeled or grooved structure above described can be formed in various ways without departing from the spirit of my invention, but it is preferably constructed in the manner illustrated in Figures 8, 9a, 9b, 9c and 9d, so that it can be easily installed as a unit in the door. Usually, the ventilating slot $x$ will be located at the front edge of the window, so that the body of the person sitting beside the window will not interfere with the circulation of air outwardly through the ventilating slot.

It is immaterial, so far as my broad idea is concerned, what type of means of mechanism is employed to operate or actuate the window C, so as to raise or lower the window, or to produce a ventilating slot or a tight joint between the front edge of the window and the front upright member 2 of the window frame. The operating mechanism may comprise separate parts or portions adapted to be operated independently of each other, to effect the vertical movement and horizontal movement of the window; it may comprise a conventional window raising and lowering mechanism, and a handle, finger piece or similar part attached to the window so as to enable the window to be manually moved horizontally; or said mechanism may consist of an operating structure or means provided with a single part that can be manipulated to effect the vertical movement of the window and also the horizontal movement of the window. I prefer to equip my improved ventilating apparatus with a window operating mechanism which is so constructed or designed that the user can actuate a crank or the like to raise and lower the window, and also to move the window horizontally either to produce the ventilating slot, or to close said slot. Preferably, said window operating mechanism is so designed that if it is actuated to adjust the window vertically, the window will automatically move horizontally to close the ventilating slot or to produce the ventilating slot, as hereinafter described.

In the preferred form of my invention illustrated in Figure 1 the window operating mechanism comprises two rock arms 4 and 4a oscillatingly mounted on a supporting member 5 positioned in the window pocket in the lower portion of the door B, and an operating crank 6 accessible from the interior of the vehicle body for actuating the arms 4 and 4a, the operating crank 6 herein illustrated being attached to a rotatable pinion 7 on the supporting member 5 which meshes with a gear 8 on the rock arm 4. The gear 8 meshes with a gear 9 on the rock arm 4a, and hence, when the operating crank 6 is rotated in one direction, the arms 4 and 4a will swing downwardly to lower the window C, and when said operating crank is rotated in the opposite direction, said arms 4 and 4a will swing upwardly to raise said window. The upper ends of the arms 4 and 4a are operatively connected with the window C preferably by means of a horizontally-disposed member E attached to or combined in any suitable way with the bottom edge portion of the window and provided with two horizontally-disposed, elongated slots 10 and 10a that receive studs or bolts 11 and 11a mounted in the upper ends of the arms 4 and 4a, respectively, the slots 10 and 10a being of such length as to provide for the necessary relative movement between the arms 4 and 4a and the member E when said arms swing in an arc to lower or raise the window C. In the form of my invention herein illustrated the member E is provided with a channel-shaped portion that receives the bottom edge of the piece of glass that constitutes the window C, and said member E is also provided with depending flanges or webs in which the elongated slots 10 and 10a are formed.

In the form of my invention illustrated in Figure 1 the elongated slots 10 and 10a in the member E are of such length that when the window C is in its closed or raised position with the front edge 1 of the window housed by the front upright member 2 of the window frame, the bolt or stud 11a in the upper end of the operating arm 4a will be spaced away from the inner end of said slot, and the stud 11 in the upper end of the arm 4 will be in engagement with the inner end of the slot 10. If ventilation of the body becomes necessary or desirable, the user simply presses the operating crank 6 so as to move it in the direction indicated by the arrow c in Figure 1, whereupon the arm 4 will swing in the direction indicated by the arrow d in Figure 1, and the stud or bolt 11 in the upper end of said arm 4 will bear against the inner end of the slot 10 and move the member E, together with the window C, rearwardly into the position shown in Figure 1, thus producing a suction slot or ventilating opening x at the front edge of the window. After the window C has thus been shifted into its ventilating position, it will remain in said position, due to the fact that the frictional engagement between the pinion 7 and the gear 8 is great enough to prevent the vibration of the vehicle from moving the arm 4 out of the position into which it was moved in the operation of shifting the window rearwardly into its ventilating position. Obviously, the elongated slot 10a that receives the stud 11a on the upper end of the operating arm 4a must be of such length that the inner end of said slot 10a will not strike against the stud 11a during the rearward movement of the member E. If the user desires to close the ventilating slot x and produce a tight or substantially tight joint between the front edge 1 of the window and the upright frame member 2, the operating crank 6 is turned slightly in the opposite direction so as to move the arm 4 forwardly slightly, whereupon a spring 12 that is arranged on the interior of the window pocket in the door will expand and exert a forward thrust on a laterally-projecting pin 13 on the member E, as shown in Figure 1. Obviously, various other means may be used to effect the automatic forward movement of the window C away from its ventilating position or exert pressure on the window in a direction tending to hold it in its forward position, but I have found that a means consisting of a flat leaf spring 12 is inexpensive and highly efficient, as it is always in readiness to act when the window C is in its ventilating position, and if the user starts to lower the window when it is in its ventilating position, the spring 12 automatically moves the window forwardly, or into such a position that when the window is thereafter raised, the front edge 1 of the window will lie in the zone of the front upright member 2 of the window frame, and hence, will make a tight joint with said frame member when the user thereafter raises the window to close the same. In order to eliminate the possibility of the window sticking or remaining in its rearwardly shifted position when the window is moved downwardly into the pocket in the lower portion of the door B, said window pocket is provided at its rear end with a cam or inclined surface 14 that is adapted to engage the rear lower corner 15 of the window and positively shift the window forwardly in the event the spring 12 fails to function properly during the operation of lowering the window, said cam or inclined surface 14 being preferably formed in the guide channel that receives the rear edge portion of the window.

A vehicle ventilating apparatus of the construction above described has the advantages of being inexpensive, highly efficient and not marring or changing the appearance of the vehicle, owing to the fact that a one-piece window performs the dual function of a complete closure for the window frame D in which it is positioned, or a partial closure of such form and arrangement that when it is adjusted into a certain position, a narrow ventilating slot $x$ is produced at one upright edge of the window through which foul air, gases, smoke and the like on the interior of the body are effectively withdrawn by the suction created on said slot by the rearwardly flowing currents of air on the exterior of the side wall of the body. When the window C is closed and in its forward position, the vehicle body presents the same appearance as the conventional automobile body, and at such times said window constitutes just as efficient a closure as the conventional one-piece automobile door glass, owing to the fact that there are tight joints at the front edge, top edge and rear edge of the window. To render the ventilating slot $x$ operative, all that is necessary is to shift the window rearwardly slightly, and subsequently, if it is desired to cut the ventilating slot out of service, all that is necessary is to shift the window forwardly slightly. My broad idea contemplates the use of any suitable kind of mechanism or mechanisms for raising and lowering the window and for moving the window horizontally into and out of its ventilating position, and therefore, I do not wish it to be understood that my invention is restricted to a window operating mechanism of the particular construction herein illustrated, wherein two rock arms are employed to raise and lower the window, and one of said arms is used to move the window horizontally. The same effect could be attained with a single operating arm or member. Moreover, while I prefer to use a mechanically-operated means to effect the rearward shifting of the window into its ventilating position, a manually-operated means could be used for this purpose without departing from the spirit of my invention.

Figure 4:
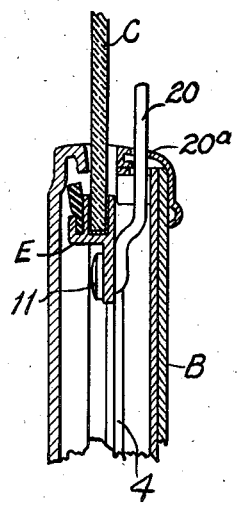
Figure 4 is an enlarged vertical sectional view, taken on the line 4—4 of Figure 3.
Figure 5:
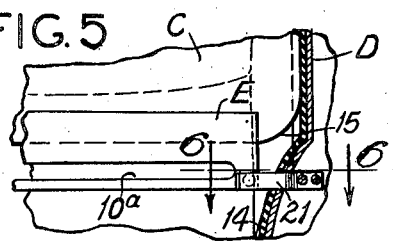
Figure 5 is a side elevational view, illustrating a friction holding device that may be employed to retain the window in its ventilating position.
Figure 7:
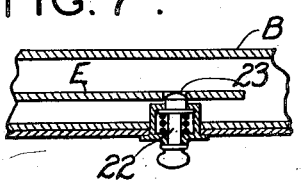
Figure 7 is a horizontal sectional view, illustrating a spring-pressed locking pin that may be used to retain the window in its ventilating position.
Figure 6:
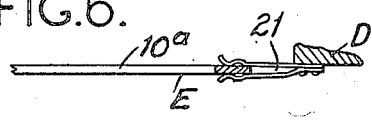
Figure 6 is a horizontal sectional view, taken on the line 6—6 of Figure 5.
Figure 8:
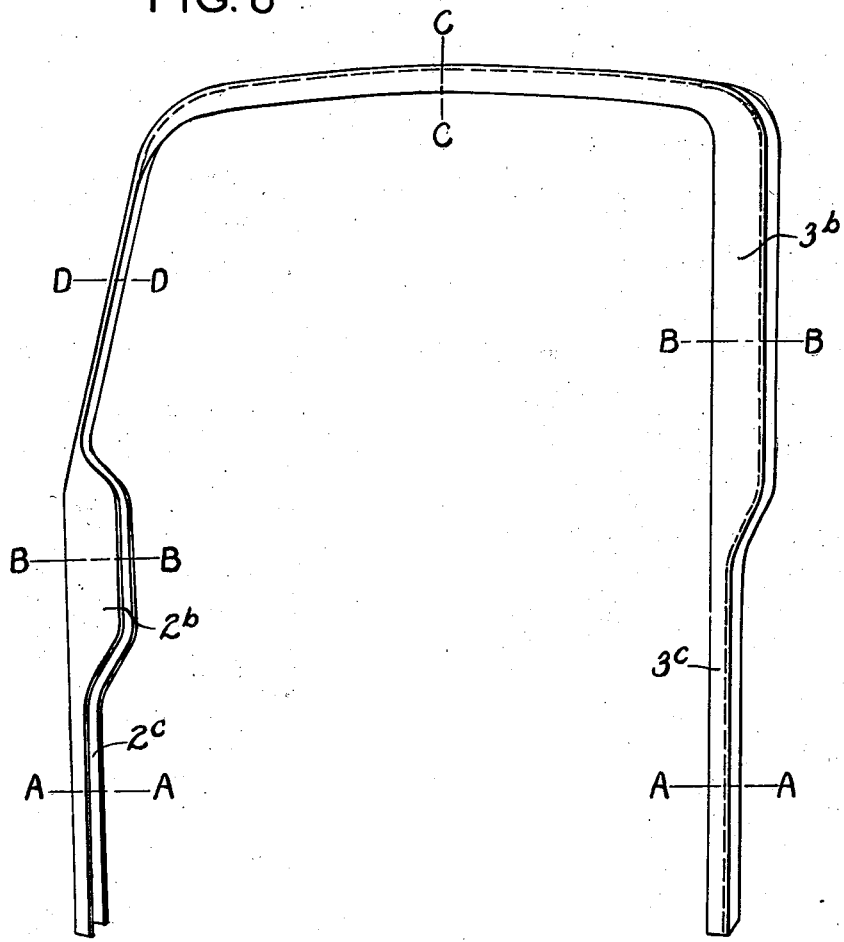
Figure 8 is a perspective view of the grooved or channeled structure that is mounted in the door so as to guide the window.
Figure 8:
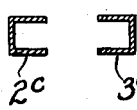
Figure 8:
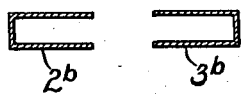
Figure 8:
Figure 8:

In Figure 3 I have illustrated a vehicle body ventilating apparatus constructed in accordance with my invention, wherein the operating arms 4 and 4ª, previously described, are used merely to raise and lower the window C, and a manually-operated means, such as a handle or finger piece 20 on the member E is used to move the window rearwardly into its ventilating position, shown in Figure 3, said handle or finger piece 20 projecting upwardly through an elongated slot in the sill or bottom member 20ª of the window frame, as shown in Figure 4, so that it can be grasped easily by an occupant of the vehicle. If it is desired to render the ventilating slot operative, the window C is lowered just a trifle so as to release the clamping pressure of the channel on the top edge of same, and the window is then moved rearwardly by manipulating the finger piece 20. Thereafter, the window is moved upwardly so as to jamb the top edge of same tightly against the channel that receives the same, thereby securely clamping the window in its ventilating position. In Figures 5 and 6 I have illustrated a friction holding means that may be used to retain the window C in its ventilating position, consisting of a bifurcated spring clip 21 mounted in the window pocket in the door in such a way that when the window is shifted rearwardly into its ventilating position, said clip will engage or grip the member E on the bottom portion of the window, and thus prevent the vibration of the vehicle from causing the window to accidentally shift forwardly. Figure 7 illustrates another kind of holding means that may be used to retain the window in its ventilating position, consisting of a spring-pressed locking pin 22 mounted in the window pocket in the door in such a position that when the window C is moved rearwardly to produce the ventilating slot $x$, said pin 22 will snap into a hole 23 provided for same in the member E, and thus securely lock the window in its ventilating position.

In Figures 10 and 11 I have illustrated another form of window operating mechanism, which, in general design and construction is similar to the one illustrated in Figure 1, except that it is provided with a shiftable guide member G that co-acts with a guideway or lugs 24 on the member E at the lower edge of the window, to automatically effect the rearward horizontal movement of the window C into its ventilating position when the window is being raised, said shiftable guide member G being so constructed that the user can adjust it in various positions so as to vary the width of the ventilating slot $x$. Usually, the guide member G will consist of a substantially vertically-disposed, flexible member mounted in the window pocket in the door, with its lower end attached to the door, and with its upper end portion projecting upwardly out of the window pocket and provided with a handle or finger piece 25 by which the user can adjust or set said member in a selected position so as to produce a full width ventilating slot or a ventilating slot of less than the maximum width. The handle or finger piece 25 may be a spring-pressed part mounted on the upper end of the guide member G, and the inside face of the door may be provided with a plurality of notches 26 that co-act with a projection on the spring-pressed handle or finger piece 25 to hold the guide member G in its adjusted position. Assuming that the user has adjusted the guide member G so as to produce a full width ventilating slot $x$, the operation of raising the window causes the window to move rearwardly into its ventilating position, due to the co-action of the guide lugs 24 on the member E, with the guide member G mounted on the door. Instead of using a flexible guide member G, a rigid guide member pivotally mounted at its lower end might be employed.

While I prefer to construct my improved vehicle ventilating apparatus in such a manner that the window C remains in its forward position during the operation of raising the same, and the shifting of the window rearwardly into its ventilating position is effected by an act on the part of the user after the window has been fully raised, such, for example, as by exerting pressure on the operating crank 6, as previously explained in connection with Figure 1, the window operating mechanism may be so constructed that when the window is moved upwardly into its fully raised position, a ventilating slot $x$ will be produced automatically at the front edge of the window, and if it is not desired to have said ventilating slot remain in service, the user must manipulate the operating crank 6 or an equivalent device, so as to shift the window horizontally to produce a tight joint between the front edge 1 of same and the front upright member 2 of the window frame. In other words, the parts of the window operating mechanism might be reversed from the position shown in Figure 1, and when constructed in this way, the apparatus will be of the form shown in Figure 12, wherein it will be noted that the spring 12 constantly exerts pressure on the member E at the lower edge of the window in a direction tending to hold the window in its rearwardly shifted position, and the front channel or guiding device in the door is provided with a cam or inclined surface 14 that co-acts with the front lower corner 15 of the window to positively shift the window rearwardly during the operation of lowering the same, in the event the window sticks, or in the event the spring 12 fails to act properly. When the operating mechanism is actuated to raise the window, the window will move upwardly in a substantially straight path and will come to rest in its substantially fully raised position, with its front edge 1 spaced away far enough from the upright member 2 of the window frame to produce a ventilating slot at the front edge of the window. In order to close said slot or throw it out of service, the user must exert pressure on the operating crank 6 in a direction to cause the arm 4ª to swing forwardly, as indicated by the arrow in Figure 12, and thus cause the pin 11ª in the upper end of said arm to exert a forward thrust on the inner end of the slot 10ª in the member E and move the window forwardly in opposition to the spring 12 so as to produce a tight joint at the front edge of the window. Thereafter, when the user starts to turn the crank 6 in a direction to lower the window, the spring 12 will act to shift the window rearwardly, or if said spring fails to act properly, the front lower corner 15 of the window will strike against the inclined surface 14 in the front channel or guiding device, and positively move the window rearwardly, as the window moves downwardly into the window pocket in the door.

Having thus described my invention, what I claim as new and desire to secure by Letters Patent is:

1. A vehicle body provided with a sliding window that is adapted to be moved vertically or substantially so into and out of a closed position, said window also being mounted so as to be capable of being moved horizontally in its plane when it is in its closed or substantially fully raised position, so as to produce a ventilating slot or opening at one upright edge of the window through which air or the like is exhausted from the interior of the body by the suction produced on said ventilating slot by rearwardly flowing air currents on the exterior of the body, and regulator mechanism having a single manual control for moving said window vertically and also horizontally in its plane.

2. In a vehicle body, the combination of a side wall provided with a window opening, and a single piece of glass constituting a window or closure for said opening, said window being mounted so as to be capable of being raised and lowered and also moved horizontally in its plane when it is in its closed or substantially fully raised position, so as to produce a ventilating slot at one upright edge of the window through which air or the like is exhausted from the interior of the body by rearwardly flowing currents of air on the exterior of said side wall, and a unitary regulator mechanism for raising and lowering said window and also for moving it horizontally in its plane.

3. In a vehicle body, the combination of a window opening in a side wall portion of the body, and a sliding window for said opening adapted to be moved vertically or substantially so into and out of a closed position, said window also being adapted to be moved longitudinally into a ventilating position, wherein air is prevented from blowing into the body around the top, bottom and one upright edge of the window, and a ventilating slot is provided at the other upright edge of the window through which air or the like is withdrawn from the interior of the vehicle by the suction produced on said ventilating slot by rearwardly flowing air currents on the exterior of the body, and regulator mechanism having a single manual control for moving said window vertically and also horizontally in its plane.

4. In a vehicle body, the combination of a side wall door provided with a window frame, and a sliding window carried by said door and adapted to be lowered into a pocket in the lower portion of the door, said window being mounted so that it is capable of being moved longitudinally in its plane when it is in its closed or substantially closed position so as to produce a ventilating slot for the purpose described at one upright edge of the window, and a single unitary regulator mechanism connected to the lower edge of the window for raising and lowering the same and also for moving the same longitudinally in its plane in one direction.

5. In a vehicle body, the combination of a sliding window that is adapted to serve as a closure for a window opening in a side wall portion of the body, and regulator means for raising and lowering said window and also moving the window horizontally in its plane in one direction so as to produce a ventilating slot at one upright edge of the window when the other upright edge and the top edge of the window are in tight or substantially tight engagement with their co-acting portions of the window frame.

6. In a vehicle body, the combination of a sliding window adapted to be moved vertically or substantially so into and out of a closed position, and a regulator mechanism for raising and lowering said window and for moving it rearwardly into a ventilating position wherein a ventilating slot is provided at the front edge of the window, said regulator mechanism being constructed so as to automatically move the window horizontally in its plane in one direction during the operation of the regulator to move the window vertically in one direction.

7. In a vehicle body, the combination of a sliding window adapted to be moved vertically or substantially so into and out of a closed position and also horizontally into and out of a ventilating position, and an operating mechanism comprising a part, which, in addition to assisting in the raising and lowering of the window, also can be manipulated so as to move the window horizontally in its plane in one direction, for the purpose described.

8. In a vehicle body, the combination of a sliding window adapted to be moved vertically or substantially so into and out of a closed position, and a regulator mechanism comprising a rock arm operatively connected with a part combined with the lower edge portion of the window, said rock arm being adapted to be moved when the window is in its closed or substantially fully raised position so as to move the window horizontally in its plane in one direction, for the purpose described.

9. In a vehicle body, the combination of a sliding window mounted so as to be capable of being moved vertically to open or close the same, and also moved horizontally in its plane so as to produce a ventilating slot at one upright edge of the window, and an operating mechanism for said window comprising a pair of rock arms provided with parts that engage elongated guideways in a member attached to the lower edge of the window, the said part on one of said rock arms being arranged so as to co-operate with its co-acting guideway to move the window horizontally in its plane in a direction when the window is in its substantially fully raised position.

10. In a vehicle body, the combination of a sliding window mounted so as to be capable of being moved vertically to open or close the same, and also moved horizontally in its plane so as to produce a ventilating slot at one upright edge of the window, an operating mechanism for moving the window vertically, and an adjustable means, capable of being set in different positions, for causing the window to move horizontally more or less, when the window is being moved vertically by said operating mechanism.

11. In a vehicle body, the combination of a sliding window mounted so as to be capable of being raised and lowered and also moved horizontally in its plane when in its substantially fully raised position so as to produce a ventilating slot at one upright edge of the window, and a guiding means for said window comprising channels that are adapted to receive the front and rear edges of the window, said channels having deep and shallow portions, arranged in such relation as to provide for the horizontal movement of the window and maintain the window at all times in operative relationship with the guiding means.

12. The combination of a vehicle window, a runway therefor, a regulator mechanism for raising and lowering said window and moving the same transversely in the plane of the window when the window is raised thereby to provide a ventilating opening through which air may be withdrawn from the vehicle, and a single manual control for said mechanism.

WILLIAM DE F. CROWELL.